US007975875B2

(12) United States Patent
Borzym

(10) Patent No.: US 7,975,875 B2
(45) Date of Patent: Jul. 12, 2011

(54) MECHANICAL GAS BOTTLE DISPENSING MACHINE

(76) Inventor: Andrzej Borzym, Granby (CA)

( * ) Notice: Subject to any disclaimer, the term of this patent is extended or adjusted under 35 U.S.C. 154(b) by 732 days.

(21) Appl. No.: 11/902,973

(22) Filed: Sep. 27, 2007

(65) Prior Publication Data

US 2009/0084810 A1 Apr. 2, 2009

(51) Int. Cl.

| | |
|---|---|
| ***A47F 1/04*** | (2006.01) |
| ***G07F 11/00*** | (2006.01) |
| ***B65G 59/00*** | (2006.01) |
| ***B65H 3/30*** | (2006.01) |

(52) U.S. Cl. .................... 221/66; 221/312 R; 221/29 B; 221/281; 221/2; 221/289; 221/286; 221/7; 221/6; 221/151; 221/299; 221/301; 221/298; 194/94; 194/22; 194/37; 194/48; 194/295; 193/358; 312/72

(58) Field of Classification Search .................... 221/66, 221/2, 279, 286, 7, 6, 151, 299, 301, 298, 221/312 R, 29 B; 193/358; 312/72; 194/94, 194/22, 37, 48, 295

See application file for complete search history.

(56) References Cited

U.S. PATENT DOCUMENTS

| | | | | |
|---|---|---|---|---|
| 2,100,423 | A * | 11/1937 | Zeigler | 221/114 |
| 3,690,430 | A * | 9/1972 | Moreland | 194/225 |
| 4,133,421 | A * | 1/1979 | Hanley et al. | 194/257 |
| 4,289,254 | A * | 9/1981 | Spring | 221/295 |
| 4,310,097 | A | 1/1982 | Merl | |
| 4,405,059 | A * | 9/1983 | Kull | 221/129 |
| 4,473,172 | A * | 9/1984 | Reynolds | 221/213 |
| 5,402,872 | A * | 4/1995 | Clurman | 194/209 |
| 5,829,630 | A * | 11/1998 | Fernald | 221/66 |
| 5,988,428 | A * | 11/1999 | Lauer | 221/19 |
| 6,321,934 | B1 | 11/2001 | Immel | |
| 6,409,045 | B1 * | 6/2002 | Lauer | 221/124 |
| 6,761,194 | B1 * | 7/2004 | Blong | 141/98 |
| 2003/0042269 | A1 * | 3/2003 | Blong | 221/93 |
| 2004/0245278 | A1 * | 12/2004 | Steffens et al. | 221/265 |

FOREIGN PATENT DOCUMENTS

| | | |
|---|---|---|
| FR | 2.101.127 | 3/1972 |
| FR | 2 423 190 | 11/1979 |
| FR | 2 602 355 A1 | 2/1988 |

* cited by examiner

*Primary Examiner* — Gene Crawford
*Assistant Examiner* — Rakesh Kumar
(74) *Attorney, Agent, or Firm* — Equinox Protection; Franz Bonsang, Patent Agent

(57) ABSTRACT

An entirely mechanical gas bottle dispensing machine that allows to either only dispense by gravity a filled bottle upon insertion of a first token or dispense a filled bottle with return of an empty bottle upon insertion of a second token.

17 Claims, 7 Drawing Sheets

MECHANICAL GAS BOTTLE DISPENSING MACHINE

FIELD OF THE INVENTION

The present invention relates to dispensing machines, and is more particularly concerned with an entirely mechanical dispensing machine for gas bottles such as propane bottles and the like.

BACKGROUND OF THE INVENTION

It is well known in the art to have dispensing machines for gas bottles and the like. Some machines are complex and include electrical and/or pneumatic devices for a proper operation, which is known to be hazardous when handling gas bottles, such propane-filled bottles or tanks. To obviate this problem, some machines are simply cages located outside a public store or the like and require a staff member of the store to go out to the gas bottle dispenser, to accompany the client, for opening and closing of the cage. In such case, typically, it is not even possible to make an exchange and return an empty bottle, since they simply do not take empty bottles.

Accordingly, there is a need for an improved entirely mechanical gas bottle dispensing machine that obviates the aforementioned difficulties and problems.

SUMMARY OF THE INVENTION

It is therefore a general object of the present invention to provide an improved mechanical gas bottle dispensing machine.

An advantage of the present invention is that the mechanical gas bottle dispensing machine is safe from any hazard since it is entirely mechanical, without using any pneumatic, hydraulic, electric and/or magnetic actuators.

Another advantage of the present invention is that the mechanical gas bottle dispensing machine allows pick-up of a filled gas bottle with or without the return of an empty bottle, and this without the need of a staff member.

Still another advantage of the present invention is that the mechanical gas bottle dispensing machine uses different tokens depending on the return of an empty bottle or not.

Another advantage of the present invention is that the mechanical gas bottle dispensing machine indicates the quantity of filled bottles that remain in the machine, and also prevents operation of the machine when the last filled bottle has been dispensed.

Yet another advantage of the present invention is that the mechanical gas bottle dispensing machine, when a return empty-gas bottle is to be supplied, functions only if the empty gas bottle is inserted into the machine at the return opening.

According to an aspect of the present invention, there is provided a mechanical gas bottle dispensing machine comprising mechanical gas bottle dispensing machine for dispensing gas-filled bottles, the machine comprises: a main structure including a slope conveyor for conveying the gas-filled bottles by gravity toward a dispensing opening extending through the main structure adjacent a lower end of the slope conveyor; and a completely mechanical bottle release system, without electric actuators, mounted on the main structure for retaining the gas-filled bottles away from the dispensing opening, the mechanical bottle release system allowing selective release of a lowermost one of the gas-filled bottles adjacent the dispensing opening upon insertion of a token therein.

Conveniently, the mechanical bottle release system includes: a filled-bottle release mechanism mounted on the main structure, the filled-bottle release mechanism allowing mechanical selective release of the lowermost gas-filled bottle adjacent the dispensing opening; a handle mechanism mechanically operatively connecting to the filled-bottle release mechanism to selectively operate the filled-bottle release mechanism; and a token receiving mechanism mechanically operatively connecting to the handle mechanism to allow activation of the handle mechanism upon insertion of the token therein.

Typically, the machine further includes a filled-bottle activated mechanism mechanically operatively connecting to the handle mechanism, for resetting the handle mechanism and the token receiving mechanism when a filled bottle is being released by the filled-bottle release mechanism.

Typically, the machine further includes a bottle dispense counting mechanism mounted onto the main structure and mechanically operatively connected to the filled-bottle activated mechanism, the bottle dispense counting mechanism mechanically counting an amount of activations of the filled-bottle activated mechanism.

Typically, the machine further includes a machine locking mechanism mechanically operatively connecting to the bottle dispense counting mechanism and to the token receiving mechanism to prevent the token receiving mechanism from receiving a token when the bottle dispense counting mechanism reached a maximum quantity of filled bottles having been dispensed from the machine since a last refill of the machine.

Conveniently, the token is a first token, the machine further includes an empty-bottle activated mechanism mounted on the main structures adjacent a return opening extending through the main structure adjacent an upper end of the slope conveyor for detecting passage of an empty bottle on the slope conveyor adjacent the return opening, the empty-bottle activated mechanism mechanically operatively connecting to the token receiving mechanism to allow insertion of a second token therein.

Typically, the machine further includes a machine locking mechanism mechanically operatively connecting to the bottle dispense counting mechanism and to the token receiving mechanism to prevent the token receiving mechanism from receiving a token and to the empty-bottle activated mechanism to prevent activation thereof by an empty bottle when the bottle dispense counting mechanism reached a maximum quantity of filled bottles having been dispensed from the machine since a last refill of the machine.

Other objects and advantages of the present invention will become apparent from a careful reading of the detailed description provided herein, with appropriate reference to the accompanying drawings.

BRIEF DESCRIPTION OF THE DRAWINGS

Further aspects and advantages of the present invention will become better understood with reference to the description in association with the following Figures, in which similar references used in different Figures denote similar components, wherein.

DETAILED DESCRIPTION OF THE PREFERRED EMBODIMENTS

With reference to the annexed drawings the preferred embodiments of the present invention will be herein described for indicative purpose and by no means as of limitation.

Figure 1:
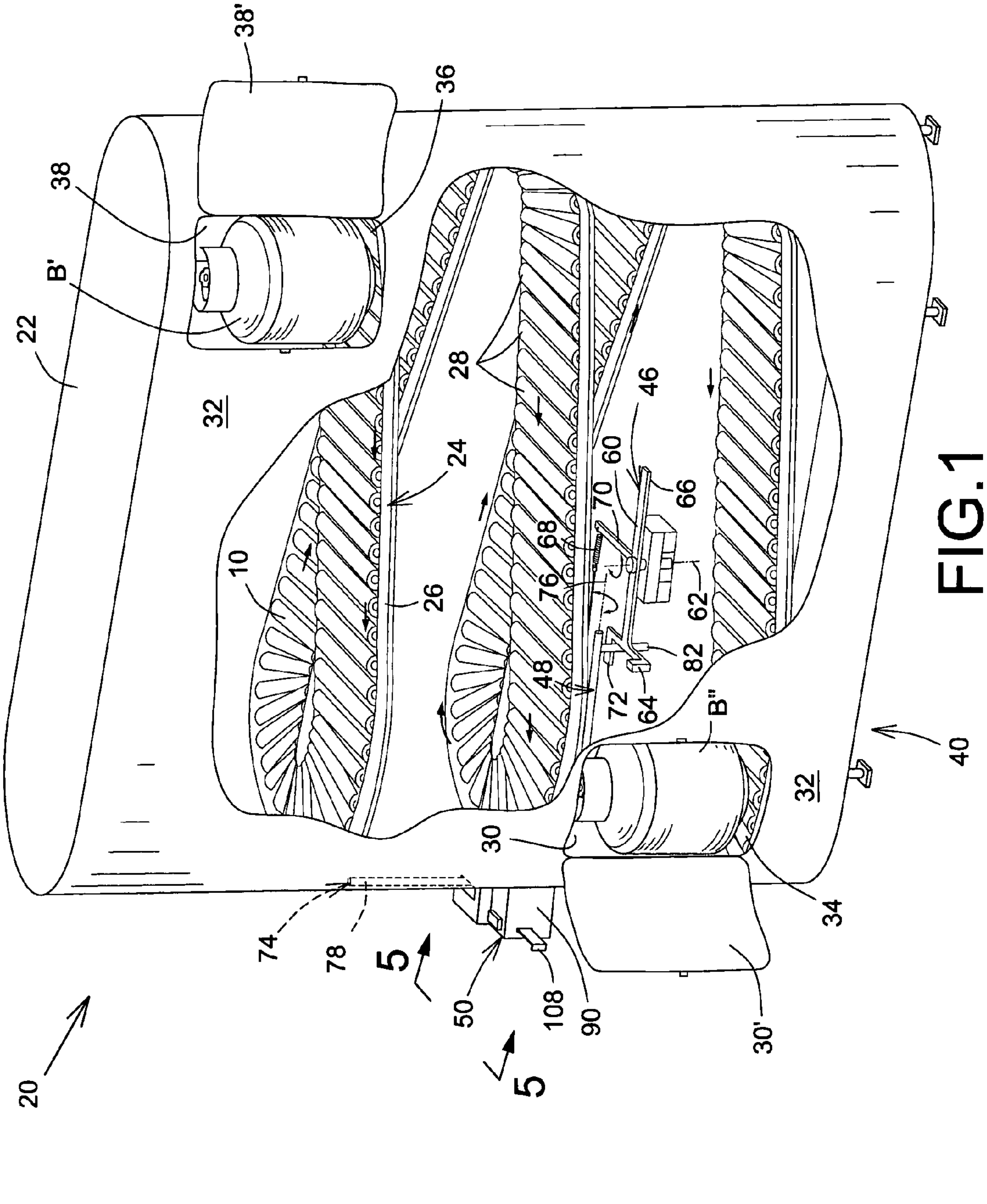
FIG. 1 is a partially broken schematic front perspective view of a mechanical gas bottle dispensing machine in accordance with an embodiment of the present invention.
Figure 2:
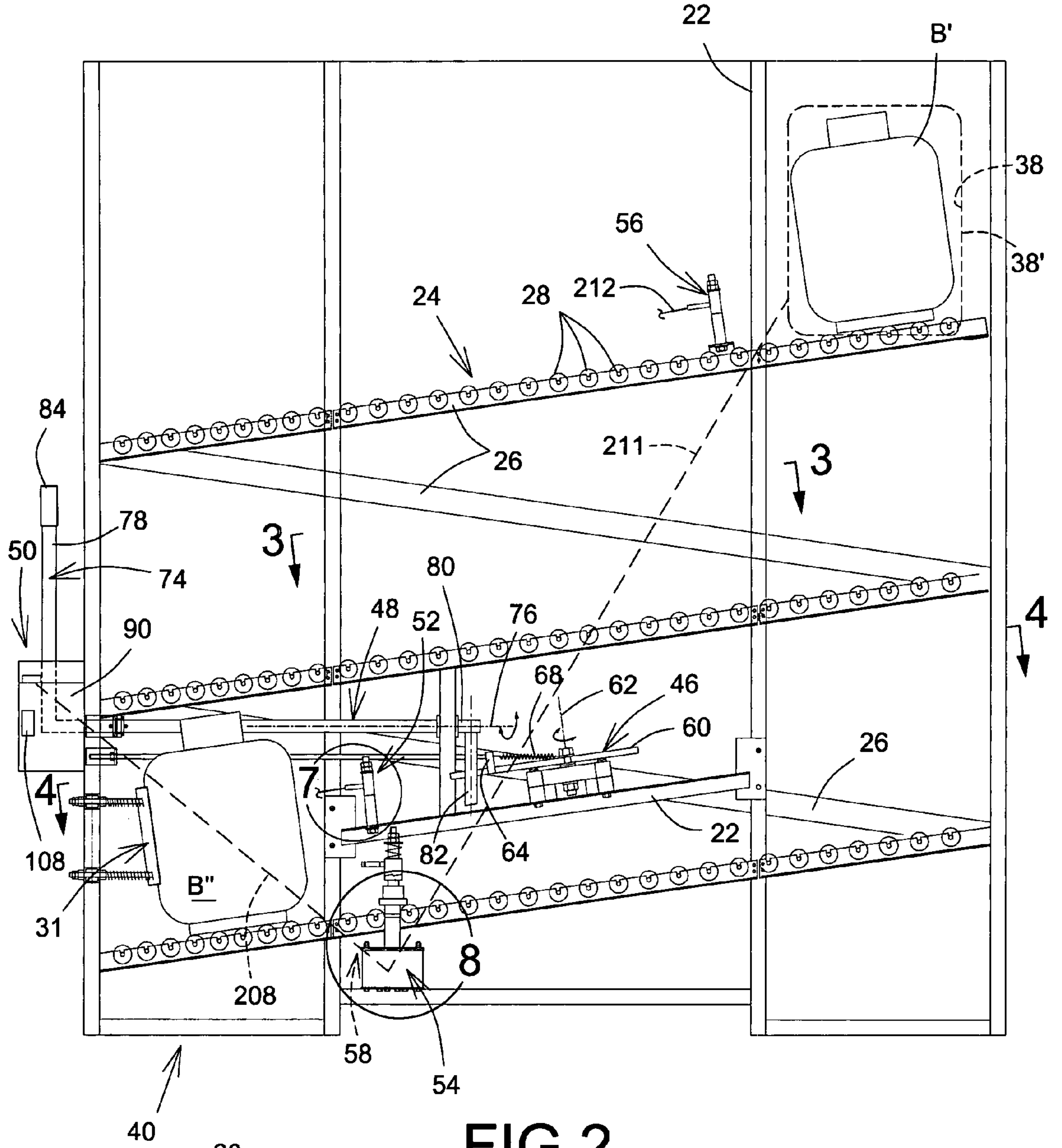
FIG. 2 is a schematic front elevation open plan view of the embodiment of FIG. 1.
Figure 3:
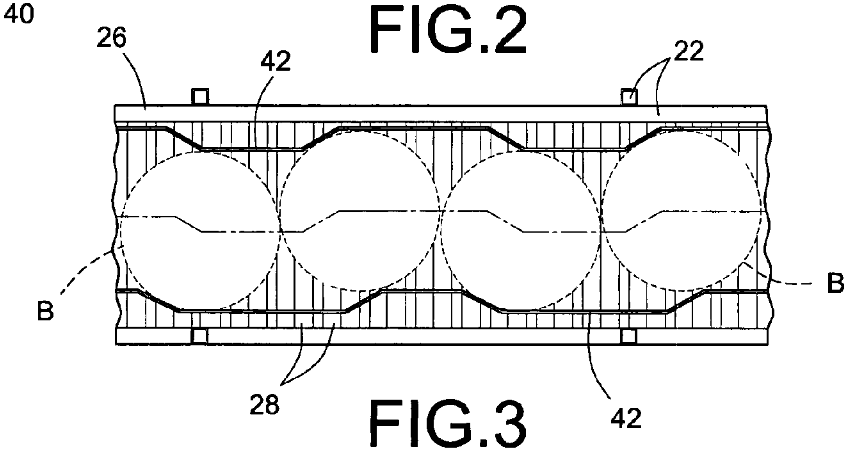
FIG. 3 is a partially broken enlarged schematic top plan view taken along line 3-3 of FIG. 2.
Figure 4:
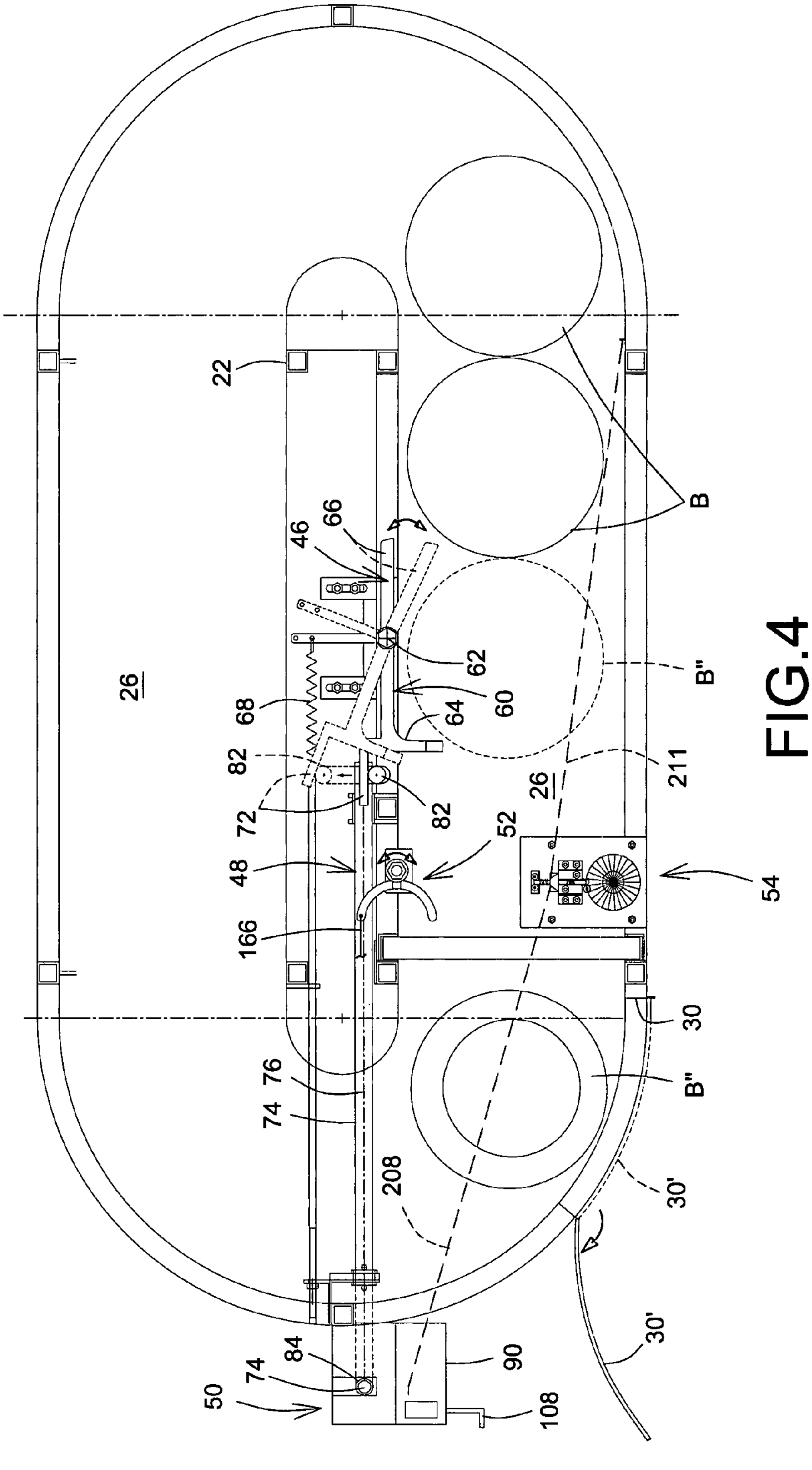
FIG. 4 is an enlarged schematic top plan view taken along line 4-4 of FIG. 2.

Reference is now made to FIGS. 1 to 9*d*, which show a mechanical gas bottle dispensing machine in accordance with an embodiment 20 of the present invention. The entirely mechanical dispensing machine 20 for preferably dispensing gas-filled bottles B such as, but not limited to, propane bottles or tanks or the like, includes a main structure 22 having a slope conveyor 24, preferably made out of a roller conveyor 26 with bearing mounted rollers 28, for conveying the gas-filled bottles B by gravity toward a dispensing opening 30 extending through an external wall 32 of the main structure 22 adjacent a lower end 34 of the slope conveyor 26. An upper end 36 of the conveyor 26 starts adjacent a return opening 38 also extending through the external wall 32 to receive the returned empty bottles B', when applicable. As shown in FIGS. 1 and 4, both the dispensing opening 30 and the return opening 38 are selectively accessed by a corresponding typically hinged door 30', 38'. A mechanical bottle release system 40 mounted on the main structure 22 retains the gas-filled bottles B away from the dispensing opening 30 allows for the selective release of the lowermost one B" of the gas-filled bottles B adjacent the dispensing opening 30, upon insertion of a corresponding token 44 therein, the token 44 is a first token used when only a filled bottle B is to be dispensed.

The main structure 22 typically includes a dispensed bottle bumper mechanism 31, such as dampers or simply conventional choc absorbent material or the like, used to smoothly stop the lowermost bottle B" being released when it reaches the dispensing opening 30, as shown in FIG. 2.

Furthermore, in order to prevent the bottles B, B' from accelerating too much under gravity when going down the slope conveyor 26, a slowing down mechanism 42, such as substantially zigzagging guides or the like, is typically mounted on the main structure 22 all along the slope conveyor

26, at preferably about mid-height of the bottles B, B', as schematically shown in FIG. 3.

Typically, the mechanical bottle release system 40 includes a filled-bottle release mechanism (FBRM) 46 mounted on the main structure 22 and allowing selective release of the lowermost gas-filled bottle B" adjacent the dispensing opening 30, a handle mechanism (HM) 48 mechanically operatively connected to the FBRM 46 to selectively operate the same, and a token receiving mechanism (TRM) 50 mechanically operatively connecting to the HM 48 to allow activation thereof upon insertion of the token 44 therein.

The machine 20 typically further includes a filled-bottle activated mechanism (FBAM) 52 connected to the HM 48 to mechanically reset the same and the TRM 50 when the lowermost filled bottle B" is being released by the FBRM 46.

A bottle dispense counting mechanism (BDCM) 54, typically mounted onto the main structure 22 and which could mechanically operatively connect to the FBAM 52, mechanically counts an amount of activations thereof.

Preferably, the machine 20 includes an empty-bottle activated mechanism (EBAM) 56 mounted on the main structure 22 adjacent the return opening 38 detects passage of an empty bottle B' passing on the slope conveyor 26 adjacent the return opening 38. The EBAM 56 mechanically operatively connects to the TRM 50 to allow insertion of a second token 44' therein, only when a empty bottle B' is returned into the machine 20 at the same time a filled bottle B is to be dispensed therefrom.

Furthermore, a machine locking mechanism (MLM) 58 mechanically operatively connects to the BDCM 54 and to the TRM 50 to prevent the latter from receiving a token 44, 44' and to the EBAM 56 to prevent activation thereof by an empty bottle B', when the BDCM 54 reached a maximum quantity M of filled bottles B having been dispensed from the machine 20 since a last refill thereof.

Although the above-mentioned mechanical systems and mechanisms will be described in details hereinbelow, one skilled in the art would readily understand that these details are preferred examples and could be differently made, arranged and connected without deviating from the scope of the present invention.

More specifically, concerning the above, the FBRM 46 shown in FIGS. 1, 2 and 4 includes a bottle abutting member 60, typically a substantially L-shaped rod or the like, pivotally mounted on the main structure 22, about an axis 62 substantially parallel to the bottle axes, between a locking position and a release position and has generally opposite first 64 and second 66 ends. The first end 64, typically the bottom section of the L-shape, abuttingly retains the lowermost gas-filled bottle B" adjacent the dispensing opening 30 away therefrom when in the locking position, as shown in dotted lines in FIG. 4, and the first end 64 releases the lowermost gas-filled bottle B" while the second end 66 abuttingly retains a second lowermost one of the gas-filled bottles B adjacent the dispensing opening 30 away therefrom when in the release position, as shown in solid lines in FIG. 4. Typically, a bottle abutting biasing member 68, such as a tension coil spring or the like, connects to the main structure 22 and a transverse extension 70 of the bottle abutting member 60 to bias the latter into a locking position. The bottle abutting member 60 is moved by the HM 48 being in abutment contact with a longitudinal extension 72 of the first end 64 of the bottle abutting member 60.

Figures 5, 6A, 6B:
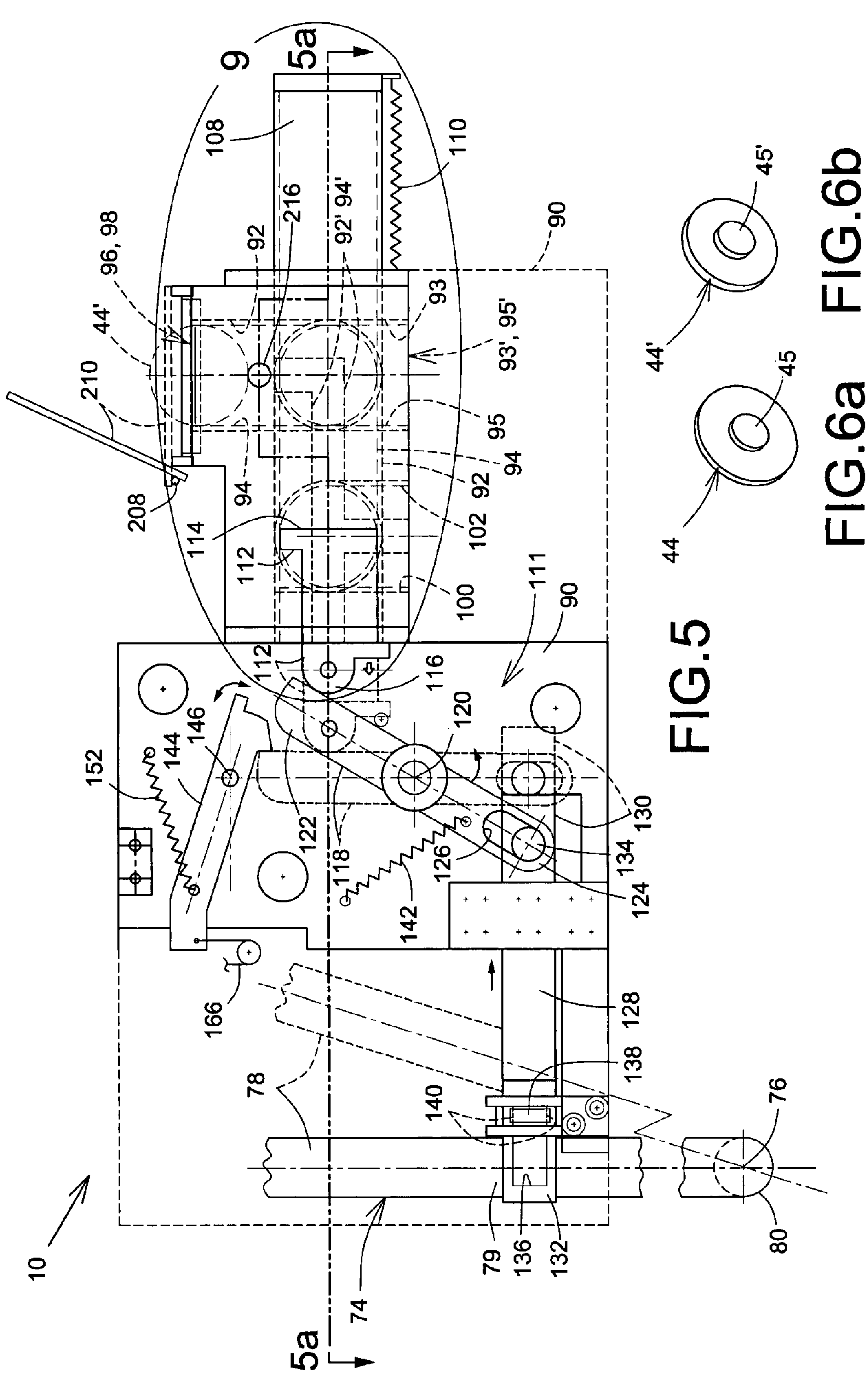
FIG. 5 is an enlarged and partially sectioned schematic open side view taken along line 5-5 of the token receiving mechanism of FIG. 1.
FIGS. 6*a* and 6*b* are schematic perspective views of the token used with the embodiment of FIG. 1 when no empty bottle is returned and when an empty gas bottle is returned, respectively.
Figure 5A:
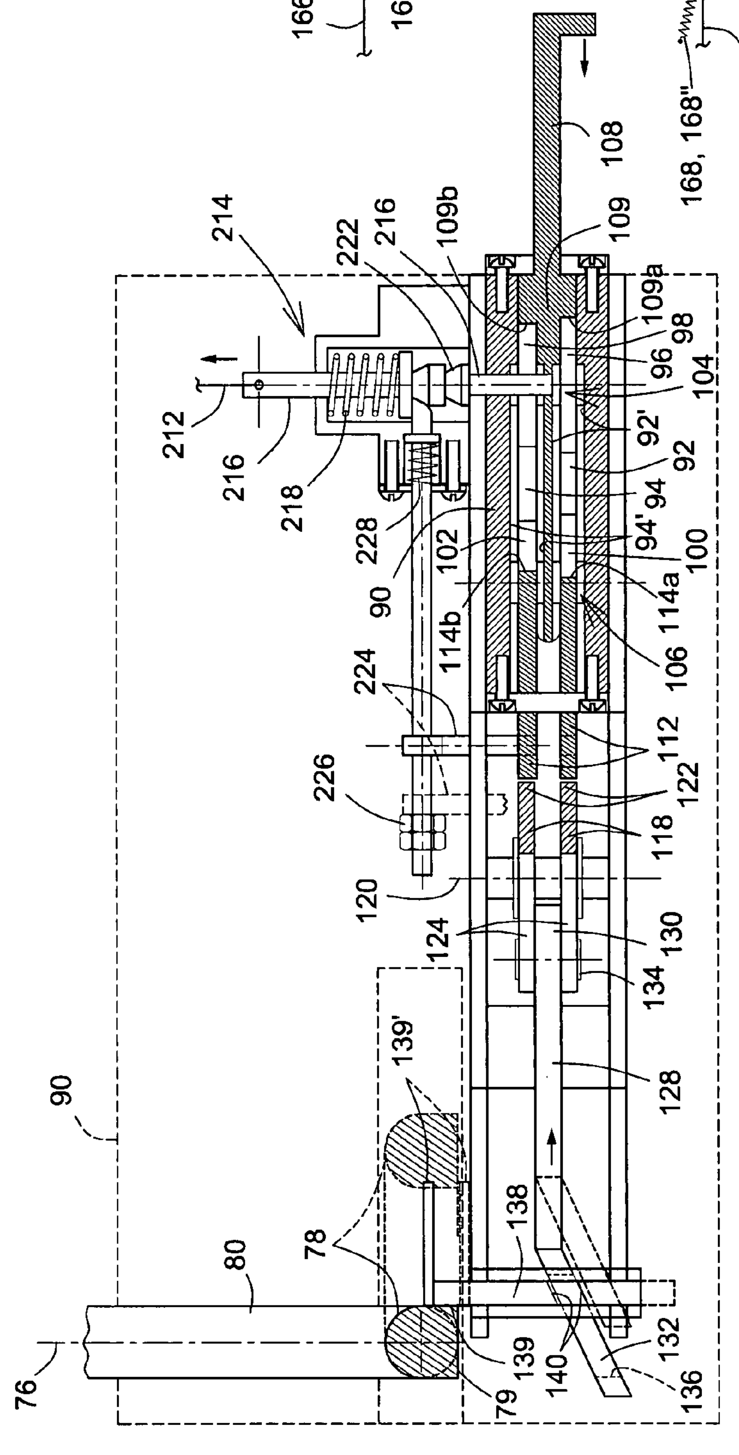
FIG. 5*a* is schematic open top view taken along line 5*a*-5*a* of the token receiving mechanism of FIG. 5.

The HM 48, also shown in FIGS. 1, 2, and 4 and FIGS. 5 and 5*a*, includes a handle member 74 pivotally mounted on the main structure 22 between first and second handle positions, shown in solid and dotted lines in FIGS. 5 and 5*a*, respectively, about a handle axis 76. The handle member 74 has generally opposite and angled, typically with a 90° angle, handle first 78 and second 80 ends. The handle second end 80, generally extending along the handle axis 76, operatively connects to the bottle abutting member 60, by abutment contact between a radial extension 82 of the handle second end 80 and the longitudinal extension 72 of the bottle abutting member 60 to displace the bottle abutting member 60 from the locking position to release position when the handle member 74 is in the first and second handle positions, respectively. Consequently, the handle member 74 is typically biased into the handle first position by the bottle abutting biasing member 68. The handle first end 78 typically includes a handgrip 84 and is activatable by a user after insertion of the token 44, 44' into the TRM 50 and the activation thereof.

As shown more specifically in FIGS. 5 and 5*a*, the TRM 50 includes a main body 90 having a first 92 and second 94 token guide channels extending there through and being substantially parallel to one another, with corresponding first 96 and second 98 token receiving slots and corresponding first 100 and second 102 token release slots located adjacent respective channel first 104 and second 106 ends, and used by the first 44 and second 44' tokens, respectively. A slide member 108 slidably mounts on the main body 90 generally along the token guide channels 92, 94 adjacent the channel first end 104 and is actuatable by the user between a retracted position and an inserted position, shown in solid and dotted lines in FIG. 5. A slide member 108 selectively and abuttingly displaces the token 44, 44' along the corresponding token guide channel 92, 94 from the channel first end 104 when in the retracted position to the channel second end 106 upon insertion of the token 44, 44' into the token receiving slot 96, 98 when in the inserted position. Typically, the slide member 108 includes a slide biasing member 110, such as a compression coil spring or the like, that connects to the main body 90 and the slide member 108 to bias the latter into the retracted position.

Typically, in order to ensure that a specific token 44, 44' can only be inserted in the corresponding token receiving slot 96, 98, the first and second tokens 44, 44' shown in FIGS. 6*a* and 6*b* respectively, which are of generally disc shapes (or any other shape could be considered without departing from the scope of the present invention), and the corresponding first and second token channels 92, 94, are of different dimensions. Accordingly, the tokens 44, 44' are of different axial dimensions (thicknesses) and of different radial dimensions (diameter sizes), with the first token 44 (see FIG. 6*a*), and its corresponding first token channel 92 and first token receiving and release slots 96, 100 (see FIGS. 5 and 5*a*), being preferably thinner and larger than the second token 44' (see FIG. 6*b*), and its corresponding second token channel 94 and second token receiving and release slots 98, 102 (see FIGS. 5 and 5*a*).

In order to prevent the use of conventional coins, or false tokens (not shown), that could have a diameter dimension relatively similar to either one of the tokens 44, 44', the token guide channels 92, 94 preferably have wider portions 92', 94' thereof to receive corresponding wider central portions 45, 45', or shoulders, of the respective tokens 44, 44', and the narrower portions of the token guide channels 92, 94 include a corresponding by-pass section 93, 95 thereof leading to a corresponding coin exit slot 93', 95' located substantially vertically under the corresponding token receiving slots 96, 98 for the coins to directly fall off the TRM 50, thereby preventing use of such coins and possible mechanism blockage they could cause.

A handle release mechanism (HRM) 111 also mounted on the main body 90 adjacent the channel second end 106 operatively connects to the HM 48 adjacent the handle first end 78. The HRM 111 is selectively operable between handle locking configuration and handle release configuration, shown in solid and dotted lines in FIG. 5 (and partially FIG. 5*a*) respectively. The HRM 111 is operated from the handle locking configuration to the handle release configuration by the token 44, 44' reaching the channel second end 106 upon sliding of the slide member 108 relative to the main body 90. The HRM 111 is selectively operated from the handle release configuration to the handle locking configuration after the token 44, 44' has exited the corresponding token guide channel 92, 94 from the corresponding token release slot 100, 102 upon retraction of the slide member 108 from the channel second end 106 toward the channel first end 104, and fallen into a token container (not shown) located down below.

Typically, as shown in FIGS. 5 and 5*a*, the HRM 111 includes a plunger member 112 slidably mounted on the main body 90 adjacent the channel second end 106 and having generally opposite first 114 and second 116 plunger ends, with the first plunger end 114 being in selective abutment contact with the token 44, 44'. In order to adapt for the different token dimensions, at least one of the slide member 108 and the plunger member 112, preferably both as illustrated in FIGS. 5 and 5*a*, have a respective token abutment end 109, 114 with two sections-a and -b (109*a*, 109*b*, 114*a*, 114*b*) complementarily sized to abut a corresponding first and second token radial dimensions, respectively.

An elongate slab 118 pivotally mounted on the main body 90 about a slab pivot axis 120 has first 122 and second 124 slab ends generally opposite relative to one another about the slab pivot axis 120, with the first slab end 122 being in selective abutment contact with the plunger second end 116. Also, a handle connecting member 128 slidably mounted on the main body 90 has generally opposite first 130 and second 132 member ends, with a shaft 134 extending from the first member end 130 pivotally and slidably connecting to the a slot hole 126 extending through the second slab end 124, and the second member end 132 slidably movably connecting to a handle locking pin or bar 138, generally transversely positioned relative thereto, for selective release of the handle first end 78 from the first handle position. To this end, a transversely channeled section 140 of the handle locking bar 138 generally slides within a slot hole 136 of the second member end 132. When the handle connecting member 128 is in the handle locking configuration, a side surface 139 of the handle locking bar 138 extends in front of the handle first end 78 to abuttingly lock the latter in the first handle position. When the handle connecting member 128 is in the handle release configuration, the handle locking bar 138 retracts away from the handle first end 78 to allow the latter to move into the second handle position with the generally flat surface 79 of the handle first end 78 substantially sliding along a generally flat top surface 139' of the locking bar 138.

The slab 118 pivots between slab first and second positions, as shown solid and dotted lines in FIG. 5, respectively, wherein the handle first end 78 is locked by and released from the handle locking bar 138, respectively. Typically, a slab biasing member 142, such as a tension coil spring or the like, connects to the main body 90 and the slab 118, typically adjacent the second slab end 124, to bias the slab 118 into the slab first position. A latch member 144 movably mounted on the main body 90, preferably pivotally mounted about a slab pivot axis 146, latches the slab 118 into the slab second position when the slab 118 reaches that slab second position, with a notch 148 of a latch member 144 selectively engaging a corresponding substantially sharp corner 150 adjacent the first slab end 122. Typically, a latch biasing member 152, such as a tension coil spring or the like, connects to the main body 90 and the latch member 144 to bias the latter into a latching configuration, in order to maintain the handle member 74 in the first handle release position and allow the handle first end 78 to be moved into the second handle position, to in turn activate the bottle abutting member 60 of the FBAM 52 and release the lowermost filled bottle B".

Figure 9A:
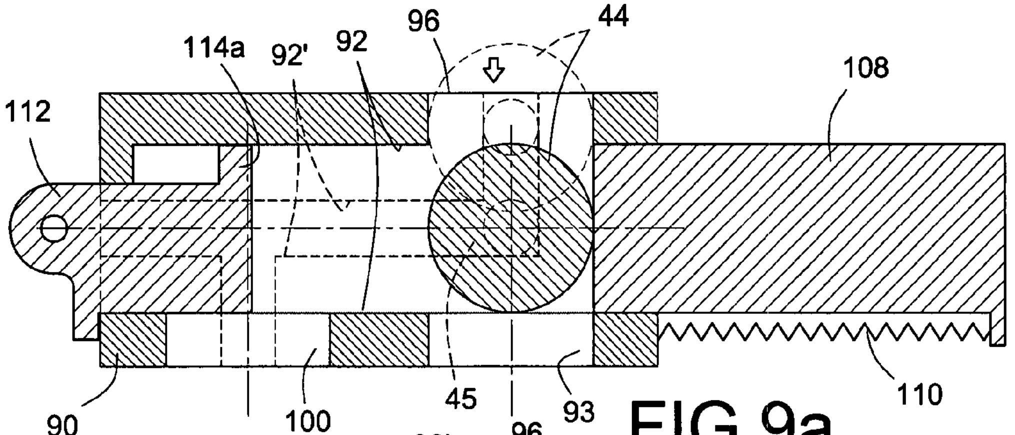
FIGS. 9*a*, 9*b*, 9*c* and 9*d* are schematic illustrations of the path of the token into the token receiving mechanism when activated by the slide member, with the token being inserted, the token pushed by the slide member to abut the handle release mechanism, the token being used to actuate the handle release mechanism, and the token being released into a used-token container upon retraction of the slide member, respectively.
Figure 9B:
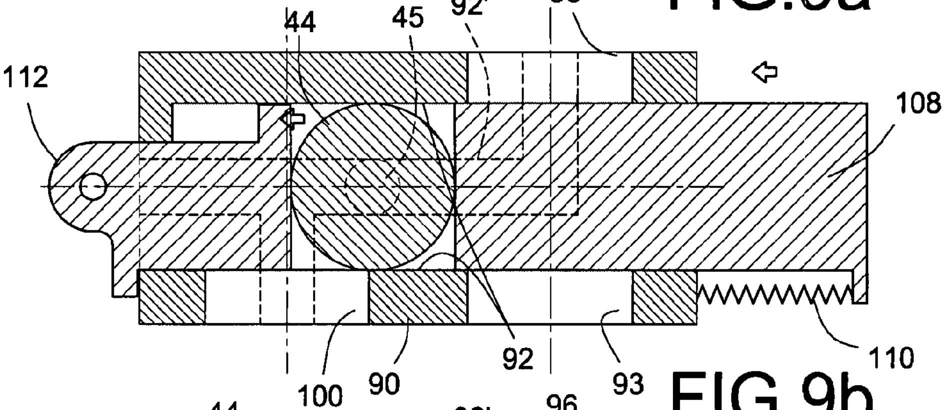
Figure 9C:
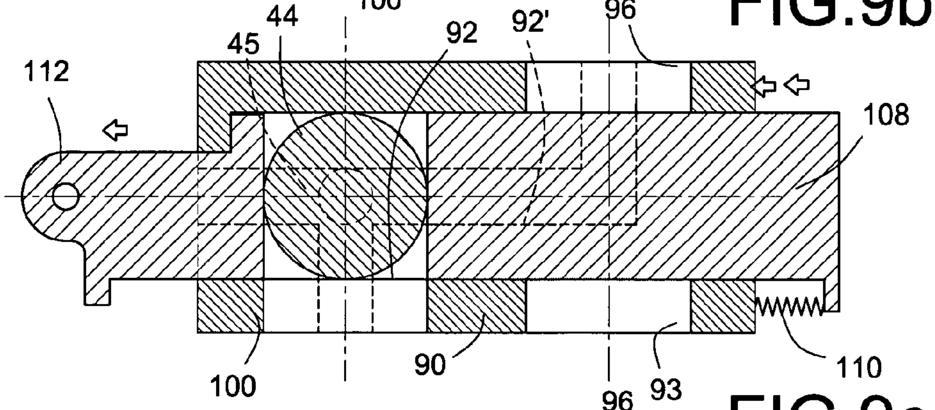
Figure 9D:
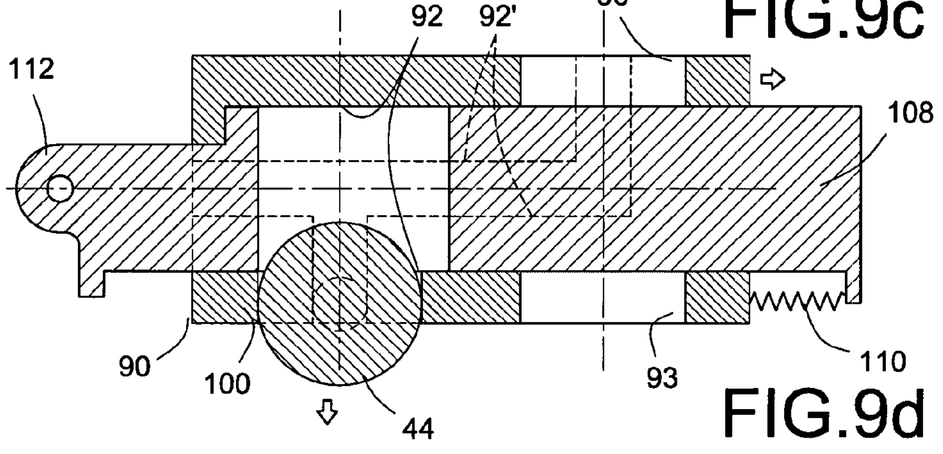

As schematically shown in FIGS. 9*a* to 9*d*, when a token, for example first token 44 for clarity purposes (the same activation applies with second token 44'), is dropped into the token receiving slot 96 (see FIG. 9*a*) and remains there until the slide member or push button 108 is depressed by the user until the token 44 abuts the plunger member 112, as shown in FIG. 9*b*. Then the plunger member 112 is also being pushed by the user, along with the token 44 and the slide member 108 until the plunger member 112 has pushed the slab 118 into the slab second position, as shown in FIG. 9*c*. Then the slide member 108 is pulled or simply released by the user, and moved backward via the slide biasing spring 110, such that pressure is removed on the token 44 that will fall down through the token release slot 100, as shown in FIG. 9*d*.

Figure 7:
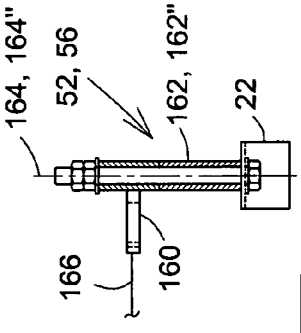
FIGS. 7 and 7*a* are enlarged schematic front elevation and top plan views of a filled-bottle activated mechanism and an empty-bottle activated mechanism of embodiment of FIG. 1.
Figure 7A:
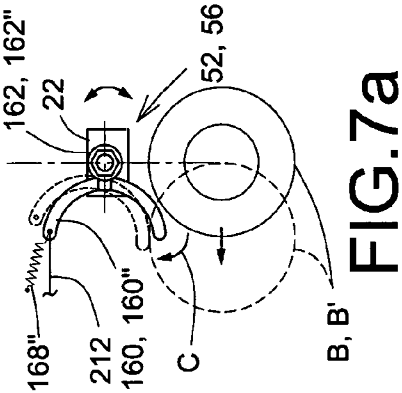

The FBAM 52, used to reset the TRM 50, includes a first arm 160 pivotally mounted onto the main structure 22 on a first arm shaft 162 about a shaft axis 164 substantially parallel to the axis of the filled bottle B located adjacent the FBAM 52 and substantially perpendicular to path of the slope conveyor 26 adjacent the FBAM 52, and adapted to be selectively abutted and pivoted by the released filled-bottle B", as shown in FIGS. 2, 7 and 7*a*. A first tension wire 166 typically operatively connects at one end to the first arm 160 and at the other end to the latch member 144 and slidably mounted on wire supporting members, such as pulleys or curved channels (not shown) connected to the main structure 22, such that when the first arm 160 pivots because of the passage of the released bottle B", as indicated by arrow C in FIG. 7*a*, the first wire 166 pulls on the latch member 144 to release the slab 118 back into the slab first position which in turn extends the handle connecting member 128 and the handle locking bar 138 back into the handle locking position.

Typically, a first arm biasing member 168, such as a tension coil spring or the like, connects to the main structure 22 and the first arm 160 to bias the latter into a position in which the first arm 160 is pivotable by a released filled bottle B" coming into selective abutment therewith.

Typically, the BDCM 54 mounted onto the main structure 22 either includes a pivotally mounted arm 160' activatable by a released filled bottle B" similar to the first arm 160 of the FBAM 52 or is operatively connected to the first arm 160 of the FBAM 52. A disc member 170 rotatably mounted on the main structure 22 and divided into a predetermined quantity (twenty-five (25) in the illustrated example) of adjacent angular segments 172 corresponding to one over a maximum quantity (for example twenty-four (24) bottles B in the illustrated machine 20) of filled bottles B storable into the machine 20. The disc member 170 rotates about axis 171 in a first direction A1 by an angular distance corresponding to one of the angular segments 172 each time a filled bottle B is released from the machine 20, via the FBAM 52 or the like. Typically, a sign 174, such as a number or the like, located on an outer wall portion 176 of at least a last one, preferably all of the angular segments 172 being visible through a display 178 when the BDCM 54 to indicate the quantity of filled bottles B left in the machine 20, as seen in FIGS. 8 and 8*b*, or having been dispensed from the machine 20 since a last refill thereof. Typically, a ratchet mechanism 180, in the form of a tapered shaft head 182 typically biased by compressive coil spring 184 shown in FIGS. 8*a* and 8*b*, mounted on the main structure 22 adjacent the disc member 170 to prevent the latter from rotating in a second direction A2 opposite the first direction A1 while allowing the disc member 170 to rotate in the first direction A1.

Figure 8A:
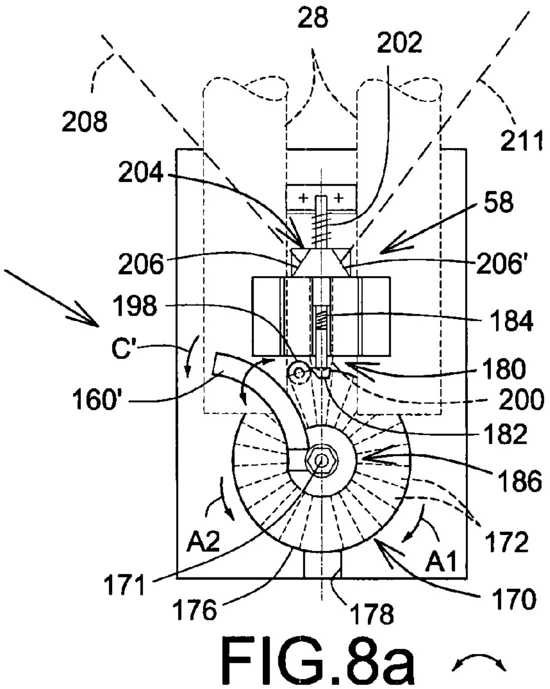
FIGS. 8, 8*a* and 8*b* are enlarged schematic front elevation, top plan, and side elevation views, respectively, of a filled-bottle dispense counting mechanism connected to a machine locking mechanism of embodiment of FIG. 1.
Figure 8B:
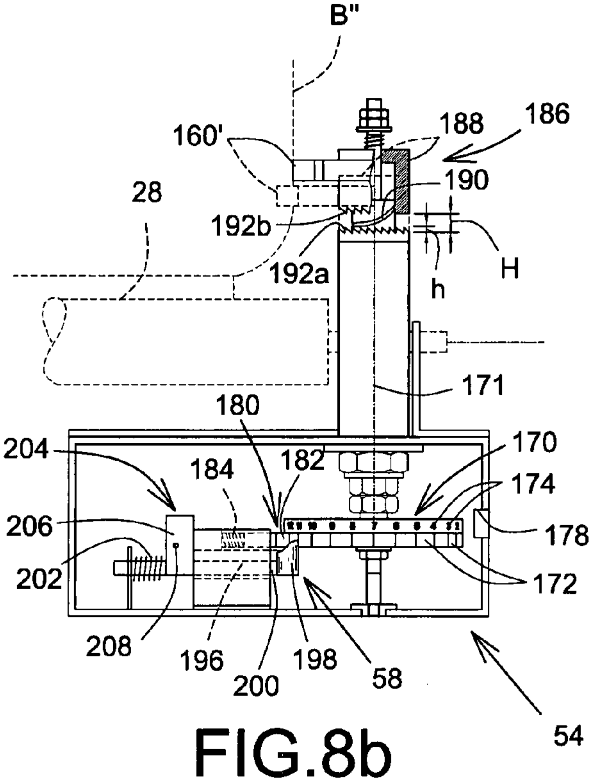
Figure 8:
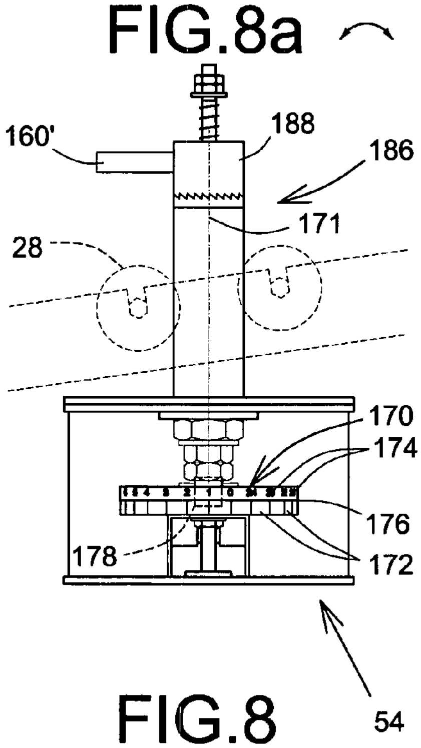

A clutch mechanism 186 schematically illustrated in FIGS. 8, 8*a* and 8*b* allows the arm 160' of the BDCM 54 to rotate the disc member 170 only by the angular distance corresponding to one of the angular segments 172 while the shaft 188 of the arm 160' rotates over a larger angle. The shaft 188 rotatably and axially slidably connects to the disc member 170 via a pin (not shown) engaging a predetermined pitch channel thread 190, and via a series of tooth-like axial protrusions 192*a*, 192*b* of the shaft 188 and the disc member 170, respectively. At the beginning of the rotation of the shaft 188 by the released bottle B' abutting the arm 160' (shown in solid lines in FIGS. 8 and 8*a*, and in dotted lines in FIG. 8*b*) in the direction indicated by arrow C' in FIG. 8*a*, the shaft 188 rotates the disc member 170 with the tooth-protrusions 192*b* engaging the corresponding tooth-protrusions 192*a* while the shaft 188 moves axially relative to the disc member 170 along the channel thread 190 by an axial displacement corresponding to the height h of the tooth-protrusions 192*a*, 192*b* until the corresponding tooth-protrusions 192*a*, 192*b* disengage from each other; after which disengagement, the shaft 188 continues rotating alone while axially sliding along the disc member axis 171 up to a total displacement H (as shown in solid lines in FIG. 8*b*). The axial height h of the tooth-protrusions 192*a*, 192*b* is sized according to the pitch angle of the thread 190 to ensure that the disc member has rotated by a distance corresponding to one of the angular segments 172 before the tooth-protrusions 192*a*, 192*b* disengage from each other. The clutch mechanism 186 includes a shaft biasing member 194, such as a compression coil spring or the like, connected to the main structure 22 and to the shaft 188 to bias the latter into the start angular position in which the tooth-protrusions 192*a*, 192*b* fully engage each other, as shown in FIG. 8.

Typically, as shown in FIGS. 4, 8*a* and 8*b*, the MLM 58 includes a movable member 196 movably, preferably sladably, mounted on the main structure 22 and selectively displaceable into a locking position by a disc protrusion member 198 axially protruding from the disc member 170, and corresponding to the last one of the angular segments 172 reaching the display 178, getting into abutment contact with a first end 200 of the movable member 196 when the last filled bottle B has been released. A biasing compression coil spring 202 or the like, is connected to the main structure 22 and the movable member 196 to bias the latter into an unlocking position. The second end 204 of the movable member 196, generally opposite the first end 200, includes a tapered surface 206 operatively connectable to a machine locking member 208, schematically illustrated in FIGS. 2, 4 and 6 by dotted lines and could represent any mechanism such as a tension wire, a rigid rod or the like, that connects to the TRM 50, preferably to a movable cover 210 of the token receiving slots 96, 98 to selectively lock the opening thereof and therefore prevent a token 44, 44' from entering the corresponding token receiving slot 96, 98, thereby preventing operation of the machine 20 after the last filled bottle B has been released therefrom. Since only a small displacement of the machine locking member 208 is sufficient to lock the corresponding mechanism, the small axial displacement of the tapered surface 206 is rather sufficient.

Similarly, the MLM 58 typically includes a return door locking member 211 operatively connecting to a second tapered surface 206' of the movable member 204, generally opposite the first one 206, and to the return opening door 38' to selectively lock opening of the return door 38' after the last filled bottle B has been released from the machine 20, thereby preventing operation of the return door 38' in absence of at least one filled bottle B into the machine 20.

Typically, to ensure an empty bottle B' is being returned into the machine 20 when the second token 44' is used for the dispense of a filled bottle B, the EBAM 56 includes a second arm 160" pivotally mounted onto the main structure 22 on a second arm shaft 162" about an axis 164" substantially parallel to an axis of an empty bottle B' located adjacent the return opening 38 and substantially perpendicular to path of the slope conveyor 26 adjacent the return opening 38, similarly to the FBAM 52, and adapted to be selectively abutted and pivoted by returned empty bottle B', as shown in FIG. 2, and also in FIGS. 7 and 7*a* for simplicity.

A second tension wire 212 typically operatively connects at one end to the second arm 160" and at the other end to a slot access locking mechanism 214 mounted on the main body 90 adjacent the second token receiving slot 98 for selectively allowing insertion of the second token 44' therein, and slidably mounted on wire supporting members, such as pulleys or curved channels (not shown) connected to the main structure 22, such that when the second arm 160" pivots because of the passage of the returned bottle B', as indicated by arrow C in FIG. 7*a*, the second wire 212 pulls on a token locking pin 216 of the slot access locking mechanism 214 to allow insertion of the second token 44' upon pivoting of the second arm 160".

Typically, a second arm biasing member 168", such as a tension coil spring or the like, connects to the main structure 22 and the second arm 160" to bias the latter into a position in which the second arm 160" is pivotable by a returned empty bottle B' coming into selective abutment therewith.

The token locking pin 216 movably extends at least partially transversely through the second token guide channel 94 adjacent the second token receiving slot 98 between a token locking position, shown in solid lines in FIG. 5*a*, wherein the pin 216 prevents access of the second token guide channel 94 to the second token 44' (see FIG. 5) and a token access position, partially shown in dotted lines in FIG. 5*a*, wherein the pin 216 allows access of the second token 44' into the second token guide channel 94. Typically, a locking pin biasing member 218, such as a compression coil spring or the like, connects to the main body 90 and the token locking pin 216 to bias the latter into the token locking position.

The slot access locking mechanism 214 typically includes a locking pin latch member 220 movably mounted on the main body 90 and being selectively in engagement with a corresponding pin notch 222 to latch the token locking pin 216 into the token access position when the token locking pin 216 reaches the token access position. Typically, the locking pin latch member 220 operatively connects to the plunger member 112 in being selectively in abutment contact with a lateral extension 224 of the plunger member 112. The plunger member 112 unlatches or releases the token locking pin 216 from the token access position upon the plunger member 112 sliding toward the elongate slab 118 with the HRM 50 reaching the handle release configuration, with the lateral extension 224 selectively abutting a latch protrusion 226 of the locking pin latch member 220. A locking pin latch biasing member 228, such as a compression coil spring or the like, connects to the main body 90 and the locking pin latch member 220 to bias the latter into a latching configuration.

Although the present invention has been described with a certain degree of particularity, it is to be understood that the disclosure has been made by way of example only and that the present invention is not limited to the features of the embodiments described and illustrated herein, but includes all variations and modifications within the scope and spirit of the invention as hereinafter claimed.

I claim:

1. A mechanical gas bottle dispensing machine for dispensing gas-filled bottles, the machine comprising:

a main structure including a slope conveyor for conveying the gas-filled bottles by gravity toward a dispensing opening extending through the main structure adjacent a lower end of the slope conveyor; and a completely mechanical bottle release system, without electric actuators, mounted on the main structure for retaining the gas-filled bottles away from the dispensing opening, the mechanical bottle release system allowing mechanical selective release of a lowermost one of the gas-filled bottles adjacent the dispensing opening upon insertion of a token therein, the mechanical bottle release system including:

a filled-bottle release mechanism mounted on the main structure, the filled-bottle release mechanism allowing mechanical selective release of the lowermost gas-filled bottle adjacent the dispensing opening;

a handle mechanism mechanically operatively connecting to the filled-bottle release mechanism to selectively operate the filled-bottle release mechanism; and a token receiving mechanism mechanically operatively connecting to the handle mechanism to allow activation of the handle mechanism upon insertion of the token therein, the filled-bottle release mechanism including a bottle abutting member pivotally mounted on the main structure between a locking position and a release position and having generally opposite first and second ends, wherein the first end abuttingly retains the lowermost gas-filled bottle adjacent the dispensing opening away therefrom when in the locking position and wherein the first end releases the lowermost gas-filled bottle while the second end abuttingly retains a second lowermost one of the gas-filled bottles adjacent the dispensing opening away therefrom when in the release position;

the handle mechanism including a handle member pivotally mounted on the main structure between first and second handle positions and having generally opposite handle first and second ends, the handle second end mechanically operatively connecting to the bottle abutting member to displace the bottle abutting member between the locking and release positions when the handle member is in the first and second handle positions, respectively, the handle first end being activatable by a user upon insertion of the token into the token receiving mechanism, the token receiving mechanism including;

a main body having a token guide channel extending therethrough with a token receiving slot and a token release slot located adjacent channel first and second ends, respectively;

a slide member slidably mounted on the main body along the token guide channel adjacent the channel first end and actuatable by the user between a retracted position and an inserted position, the slide member selectively and abuttingly displacing the token along the token guide channel from the channel first end when in the retracted position to the channel second end upon insertion of the token into the token receiving slot when in the inserted position; and a handle release mechanism mounting on the main body adjacent the channel second end and operatively connecting to the handle member adjacent the handle first end, the handle release mechanism being selectively operable between handle locking and handle release configurations, the handle release mechanism being operable from the handle locking configuration to the handle release configuration by the token reaching the channel second end upon sliding of the slide member relative to the main body, the handle release mechanism being selectively operable from the handle release configuration to the handle locking configuration after the token having exited the token guide channel from the token release slot upon retraction of the slide member from the channel second end toward the channel first end, the handle release mechanism includes;

a plunger member slidably mounted on the main body adjacent the channel second end and having generally opposite first and second plunger ends, the first plunger end being selectively in abutment contact with the token;

an elongate slab pivotal mounted on the main body about a slab pivot axis and having first and second slab ends generally opposite relative to one another about the slab pivot axis, the first slab end being in selective abutment contact with the plunger second end;

a handle connecting member slidably mounted on the main body and, having generally opposite first and second member ends, the first member end pivotally and slidably connecting to the second slab end, the second member end movably connecting to a handle locking pin for selective release of the handle first end from the first handle position, wherein the slab pivots between slab first and second positions wherein the handle first end is locked by and released from the handle locking pin when the slab is in the slab first and second position, respectively; and a latch member movably mounted on the main body and latching the slab into the slab second position when the slab reaches the slab second position.

2. The machine of claim 1, further including:

a filled-bottle activated mechanism mechanically operatively connecting to the handle mechanism, for resetting the handle mechanism and the token receiving mechanism when a filled bottle is being released by the filled-bottle release mechanism.

3. The machine of claim 2, further including:

a bottle dispense counting mechanism mounted onto the main structure and mechanically operatively connected to the filled-bottle activated mechanism, the bottle dispense counting mechanism mechanically counting an amount of activations of the filled-bottle activated mechanism.

4. The machine of claim 3, further including:

a machine locking mechanism mechanically operatively connecting to the bottle dispense counting mechanism and to the token receiving mechanism to prevent the token receiving mechanism from receiving a token when the bottle dispense counting mechanism reached a maximum quantity of filled bottles having been dispensed from the machine since a last refill of the machine.

5. The machine of claim 3, wherein the token is a first token, the machine further including:

an empty-bottle activated mechanism mounted on the main structure adjacent a return opening extending through the main structure adjacent an upper end of the slope conveyor for detecting passage of an empty bottle on the slope conveyor adjacent the return opening, the empty-bottle activated mechanism mechanically operatively connecting to the token receiving mechanism to allow insertion of a second token therein.

6. The machine of claim 5, further including:

a machine locking mechanism mechanically operatively connecting to the bottle dispense counting mechanism and to the token receiving mechanism to prevent the token receiving mechanism from receiving a token and to the empty-bottle activated mechanism to prevent activation thereof by an empty bottle when the bottle dispense counting mechanism reached a maximum quantity of filled bottles having been dispensed from the machine since a last refill of the machine.

7. The machine of claim 1, further including:

a filled-bottle activated mechanism for resetting the token receiving mechanism, the filled-bottle activated mechanism mechanically operatively connecting to the latch member to unlatch the slab from the slab second position when a filled bottle is being released by the bottle abutting member reaching the release position and to selectively move the handle locking pin to lock the handle first end in the first handle position.

8. The machine of claim 7, wherein the filled-bottle activated mechanism includes:

an arm pivotally mounted onto the main structure about an axis substantially parallel to an axis of the filled bottle located adjacent the filled-bottle activated mechanism and substantially perpendicular to path of the slope conveyor adjacent the filled-bottle activated mechanism, the arm being selectively abutted by a released filled-bottle; and a tension wire connecting to the arm and to the latch member and slidably mounted on wire supporting members connected to the main structure.

9. The machine of claim 8, further including:

a bottle dispense counting mechanism mounted onto the main structure and mechanically operatively connected to the arm of the filled-bottle activated mechanism, the bottle dispense counting mechanism mechanically counting an amount of reciprocating pivoting displacements of the arm.

10. The machine of claim 9, wherein the bottle dispense counting mechanism includes:

a disc member rotatably mounted on the main structure and divided into a predetermined quantity of adjacent angular segments corresponding to a maximum quantity of filled bottles storable into the machine, the disc member rotating in a first direction by an angular distance corresponding to one of the angular segments, at least a last one of the angular segment being visible through a display when the bottle dispense counting mechanism reached the maximum quantity of filled bottles having been dispensed from the machine since a last refill of the machine;

a ratchet mechanism mounting on the main structure adjacent the disc member, the ratchet mechanism preventing the disc member from rotating in a second direction opposite the first direction while allowing the disc member to rotate in the first direction; and a clutch mechanism mounting on the main structure and mechanically connecting to the disc member, the clutch mechanism being activated by a filled bottle being released from the filled-bottle release mechanism to rotate the disc member only by the angular distance corresponding to one of the angular segments at each activation thereof.

11. The machine of claim 10, further including:

a machine locking mechanism mechanically operatively connecting to the bottle dispense counting mechanism and to the token receiving mechanism to prevent the token receiving mechanism from receiving a token when the bottle dispense counting mechanism reached the maximum quantity of filled bottles having been dispensed from the machine since a last refill of the machine.

12. The machine of claim 11, wherein the disc member includes a protrusion member protruding therefrom and corresponding to the last one of the angular segments reaching the display, the machine locking mechanism including:

a movable member movably mounted on the main structure and being selectively displaceable by the disc protrusion member when the bottle dispense counting mechanism reached the maximum quantity of filled bottles having been dispensed from the machine since a last refill of the machine; and a locking member mechanically operatively connecting to the movable member and to a movable cover of the token receiving slot to selectively lock opening of the movable cover to prevent a token from entering the token receiving slot, thereby preventing operation of the machine in absence of at least one filled bottle therein.

13. The machine of claim 12, wherein the token is a first token, the machine further including:

an empty-bottle activated mechanism mounted on the main structure adjacent a return opening extending through the main structure adjacent an upper end of the slope conveyor for detecting passage of an empty bottle on the slope conveyor adjacent the return opening, the empty-bottle activated mechanism mechanically operatively connecting to the token receiving mechanism to allow insertion of a second token therein.

14. The machine of claim 13, wherein the main body having a token guide channel is a first token guide channel, and the token receiving and release slots located adjacent channel first and second ends are first token receiving slot and first token release slot, respectively, the token receiving mechanism including:

a second token guide channel extending through the main body adjacent and parallel to the first token guide channel, the second token guide channel having a second token receiving slot and a second token first located adjacent first token receiving and release slots, respectively, the slide member selectively and abuttingly displacing either the first or the second token along the corresponding first or second token guide channel from the channel first end when in the retracted position to the channel second end upon insertion of the first or second token into the corresponding first or second token receiving slot when in the inserted position, the first plunger end being correspondingly selectively in abutment contact with either the first or the second token to activation of the handle release mechanism.

15. The machine of claim 14, wherein the arm is a first arm and the tension wire is a first tension wire, the empty-bottle activated mechanism including:

a second arm pivotally mounted onto the main structure about an axis substantially parallel to an axis of the filled-bottle located adjacent the return opening and substantially perpendicular to path of the slope conveyor adjacent the return opening, the second arm being selectively abutted by a returned empty bottle;

a slot access locking mechanism mounted on the main body adjacent the second token receiving slot for selectively allowing insertion of the second token into the second token receiving slot; and a second tension wire connecting to the second arm and to the slot access locking mechanism and slidably mounted on wire supporting members connected to the main structure to allow activation of the slot access locking mechanism upon pivoting of the second arm.

16. The machine of claim 15, wherein the slot access locking mechanism includes:

a token locking pin movably extending at least partially transversely through the second token guide channel adjacent the second token receiving slot between a token locking position wherein the pin prevents access of the second token guide channel to the second token and a token access position wherein the pin allows access of the second token into the second token guide channel, the token locking pin connecting to the second tension wire; and a locking pin latch member movably mounted on the main body and latching the token locking pin into the token access position when the token locking pin reaches the token access position, the locking pin latch member mechanically operatively connecting to the plunger member, the plunger member unlatching the token locking pin from the token access position upon the plunger member sliding toward the elongate slab with the handle release mechanism reaching the handle release configuration.

17. The machine of claim 16, wherein the return opening includes a return door movably mounted on the main structure for selective access of the return opening, the machine locking mechanism including a return door locking member mechanically operatively connecting to the movable member and to a return door to selectively lock opening of the return door when the bottle dispense counting mechanism reached the maximum quantity of filled bottles having been dispensed from the machine since a last refill of the machine, thereby preventing operation of the return door in absence of at least one filled bottle into the machine.

* * * * *